United States Patent Office 2,837,519
Patented June 3, 1958

2,837,519
ACCELERATOR OF VULCANIZATION OF RUBBER

Albert F. Hardman, Northampton Township, Summit County, Ohio, assignor to The Goodyear Tire & Rubber Company, Akron, Ohio, a corporation of Ohio No Drawing. Application September 23, 1954
Serial No. 458,026

13 Claims. (Cl. 260—247.1)

This invention relates to amino azole disulfides and to a method of making these materials.

Amino azole disulfides are powerful accelerators of vulcanization of rubber. They can be used to promote the curing of rubber with or without sulfur. These materials are particularly useful in black tread stocks and other compositions containing rubber in which a powerful, yet delayed action, non-scorching accelerator is needed to promote the curing of the rubber composition.

The compounds with which this invention is concerned are the secondary amino azole disulfides. These compounds have the following general structure:

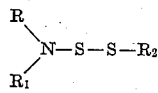

in which R and $R_1$ are the same or different aliphatic groups, cycloaliphatic groups or aralkyl groups or R and $R_1$ together form a single chain or ring and $R_2$ represents a member of the class consisting of thiazoles, oxazoles and imidazoles.

According to this invention amino azole disulfides are prepared by reacting an azolesulfenamide with sulfur.

The reaction appears to proceed according to the following equation in which N-oxydiethylene-2-benzothiazolesulfenamide is used as a repersentative starting material.

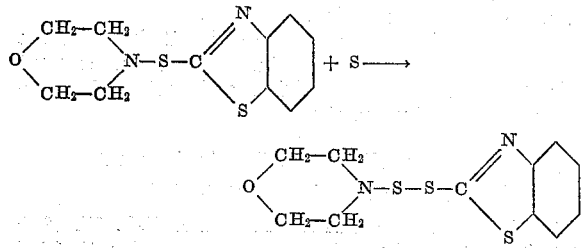

The practice of the invention is illustrated by the following representative examples.

Example 1

Twenty-six grams of N-oxydiethylene-2-benzothiazolesulfenamide, 3.2 grams of sulfur, 150 cc. of ethanol and 8.5 grams of morpholine, as a catalyst, were placed in a 500 milliliter 3-neck flask equipped with a stirrer and reflux condenser. The mixture was stirred and refluxed for two hours. It was then cooled and the crystalline product was filtered from the solution. The product was washed with alcohol and dried. A yield of 24.5 grams of product melting at 133–135° C. was obtained.

The above example shows the preparation of an aminothiazoledisulfide using the preformed sulfenamide as the starting material. The same product can be made by preparing the sulfenamide "in situ" in the presence of sulfur. This technique is illustrated in Examples 2 and 3.

Example 2

Thirty-six grams of morpholine, 7 grams of sulfur, 34 grams of 2,2'-bis (benzothiazyl) disulfide and 100 milliliters of isopropanol were placed in a 500 milliliter 3-neck flask equipped with a stirrer, reflux condenser and dropping funnel. The mixture was stirred and heatd at 70° C. until all of the materials went into solution. Sixty milliliters of 1.95 molal sodium hypochlorite solution were slowly added through the dropping funnel at a temperature of 60 to 65° C. The mixture began to crystallize and an additional 50 milliliters of isopropanol were added and the oxidation was completed at 55 to 60° C. The mixture was stirred for one-half hour and then cooled and filtered. The product obtained was washed with cold isopropanol and dried. A yield of 46 grams of product melting at 134–135° C. was obtained.

Example 3

Thirty-four grams of 2,2'-bis (benzothiazyl) disulfide, 7 grams of sulfur, 26 grams of morpholine, 150 milliliters of isopropanol and 13 grams of N-chloromorpholine were placed in a 500 milliliter 3-neck flask equipped with a stirrer and reflux condenser. The mixture was stirred and heated at refluxing temperature. In a few minutes the suspension became clear and crystals began to separate. After one-half hour the mixture was cooled and filtered. The product obtained was washed with isopropanol and water and dried. A yield of 53 grams of product melting at 133–134° C. was obtained.

The sulfenamide can also be prepared in situ by reacting one mol of an aminemonosulfide with one mol of the azyldisulfide to form a mixture of the amino azole disulfide and the sulfenamide as shown in my copending application Serial No. 458,027, filed September 23, 1954. The mixture can then be reacted with sulfur as in the examples above so that the entire product is the amino azole disulfide.

The examples above illustrate the invention with particular respect to the preparation of 2-(4-morpholinyldithio) benzothiazole. Other amino azole disulfides can be prepared by similarly reacting azolesulfenamides containing different substituents on the nitrogen atom. Thus, 2-(di-n-propylaminodithio)benzothiazole is prepared by reacting 2-(di-n-propyl)benzothiazole sulfenamide with sulfur; 2-(di-n-butylaminodithio)benzothiazole by reacting 2-(di-n-butyl)benzothiazole sulfenamide with sulfur and 2-piperidyldithiobenzothiazole by reacting 2-piperidyl benzothiazole sulfenamide with sulfur. The sulfenamides can be prepared by any suitable method. They can be made and purified separately and used as the starting material, or, alternatively, they can be mde in situ and reacted as formed. Sulfenamides usable in the process of this invention are the thiazole, oxazole and imidazole sulfenamides formed from secondary amines. They can be represented by the structural formula

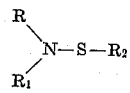

in which R and $R_1$ are the same or different aliphatic radicals, cycloaliphatic radicals or aralkyl radicals or can be joined to form a single chain or ring and $R_2$ is a thiazole, oxazole or imidazole. Thus, included are sulfenamides in which R and $R_1$ are a closed chain, which can be interrupted by sulfur, oxygen or an imino group (=NH). Representative examples of these sulfenamides are:

N,N-dimethyl-2-thiazolesulfenamide
N,N-dimethyl-4-methyl-2-thiazolesulfenamide
N,N-dimethyl-4-ethyl-2-thiazolesulfenamide
N,N-dimethyl-2-benzothiazolesulfenamide N,N-dimethyl-2-tetrahydrobenzothiazolesulfenamide
N,N-diethyl-2-thiazolesulfenamide
N,N-diethyl-4-methyl-2-thiazolesulfenamide
N,N-diethyl-4-ethyl-2-thiazolesulfenamide
N,N-diethyl-2-benzothiazolesulfenamide
N,N-diethyl-2-tetrahydrobenzothiazolesulfenamide
N,N-dipropyl-2-thiazolesulfenamide
N,N-dipropyl-4-methyl-2-thiazolesulfenamide
N,N-dipropyl-4-ethyl-2-thiazolesulfenamide
N,N-dipropyl-2-benzothiazolesulfenamide
N,N-dipropyl-2-tetrahydrobenzothiazolesulfenamide
N,N-dibutyl-2-thiazolesulfenamide
N,N-dibutyl-4-methyl-2-thiazolesulfenamide
N,N-dibutyl-4-ethyl-2-thiazolesulfenamide
N,N-dibutyl-2-benzothiazolesulfenamide
N-methyl-N-cyclohexyl-2-benzothiazolesulfenamide
N,N-dibenzyl-2-benzothiazolesulfenamide
N,N-dibutyl-2-tetrahydrobenzothiazolesulfenamide
Piperidyl-2-thiazolesulfenamide
Piperidyl-4-methyl-2-thiazolesulfenamide
Piperidyl-4-ethyl-2-thiazolesulfenamide
Piperidyl-2-benzothiazolesulfenamide
Piperidyl-2-tetrahydrobenzothiazolesulfenamide.

The corresponding oxazole and imidiazole sulfenamides are also usable in the process of this invention to provide the corresponding oxazole and imidazole disulfides which can also be used as accelerators of vulcanization of rubber.

The reactions of the above examples were all carried out at about the refluxing temperature of the mixture. Lower temperatures can be used, but the time of reaction then must be increased to get complete reaction. The temperature is not critical, but it is desirable to use a temperature that will give reasonably fast reaction rates so that the process may be economically carried out. For most efficient use of the reactants one mol of the sulfenamide is used to about one mol of sulfur, but an excess of either reactant can be used, if desired. Solvents may be present and amine catalysts can be used to speed up the reactions. Solvents which have been found to be suitable for use in this process are the lower aliphatic alcohols such as methanol, ethanol, isopropanol, normal propanol and normal butanol and other solvents such as benzene, toluene and xylene. Amines which have been found to be effective in catalyzing the reaction of the sulfenamide with sulfur are morpholine, cyclohexylamine and other amines which exert a solvent action on sulfur.

While certain representative embodiments and details have been shown for the purpose of illustrating the invention, it will be apparent to those skilled in this art that various changes and modifications may be made therein without departing from the spirit or scope of the invention.

I claim:
1. The method of preparing 2-(4-morpholinyldithio) benzothiazole which comprises reacting N-oxydiethylene-benzothiazole-sulfenamide with sulfur.

2. The method of preparing 2-(di-n-propylaminodithio) benzothiazole which comprises reacting 2-(di-n-propyl) benzothiazole-sulfenamide with sulfur.

3. The method of preparing 2-(di-n-butylaminodithio) benzothiazole which comprises reacting 2-(di-n-butyl) benzothiazole-sulfenamide with sulfur.

4. The method of preparing 2-(piperidyldithio) benzothiazole which comprises reacting 2-piperidylbenzothiazolesulfenamide with sulfur.

5. The method of preparing an amino azole disulfide which comprises condensing a secondary amine with an azyl disulfide and sulfur.

6. The method of preparing an amino azole disulfide which comprises mixing and heating a mixture of a secondary amine, an azyl disulfide and sulfur, adding an oxidizing agent, and further heating the mixture.

7. The method of preparing an amino azole disulfide which comprises oxidizing a mixture of a secondary amine and an azyl disulfide to produce a sulfenamide and reacting said sulfenamide with sulfur.

8. The method which comprises reacting morpholine, sulfur, 2,2' bis (benzothiazyl) disulfide and sodium hypochlorite in a solvent.

9. The method which comprises reacting morpholine, sulfur, 2,2' bis (benzothiazyl) disulfide and N-chloro morpholine in a solvent.

10. The method of preparing an amino azole disulfide which comprises reacting sulfur and an amino azole sulfenamide having the formula:

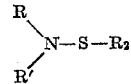

in which R and R' are radicals selected from the group consisting of aliphatic hydrocarbon, cycloaliphatic hydrocarbon, aralkyl and radicals in which R and R' together form a single ring selected from the group consisting of alkylene, oxyalkylene, thioalkylene and iminoalkylene and $R_2$ is a radical selected from the class consisting of 2-thiazolyl, 2-oxazolyl and 2-imidazolyl.

11. The method of preparing an amino azole disulfide which comprises reacting sulfur and an amino azole sulfenamide.

12. The method as claimed in claim 10 in which the reaction is carried out in the presence of an amine which exerts a solvent action on sulfur, said amine acting as a catalyst for the reaction.

13. The method as claimed in claim 12 in which the reaction is carried out in an organic solvent selected from the group consisting of lower alkanols and monocyclic aromatic hydrocarbons.

References Cited in the file of this patent
UNITED STATES PATENTS

| | | |
|---|---|---|
| 2,273,321 | Jones | Feb. 17, 1942 |
| 2,343,524 | Blake | Mar. 7, 1944 |
| 2,514,208 | Smith | July 4, 1950 |